US010328974B2

(12) United States Patent
Shichino et al.

(10) Patent No.: US 10,328,974 B2
(45) Date of Patent: Jun. 25, 2019

(54) DRIVING SUPPORT DEVICE

(71) Applicant: Toyota Jidosha Kabushiki Kaisha, Toyota-shi, Aichi-ken (JP)

(72) Inventors: Kosuke Shichino, Toyota (JP); Kayo Yoshida, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 16/012,039

(22) Filed: Jun. 19, 2018

(65) Prior Publication Data
US 2018/0362085 A1 Dec. 20, 2018

(30) Foreign Application Priority Data

Jun. 20, 2017 (JP) .................. 2017-120379

(51) Int. Cl.
*B62D 15/02* (2006.01)
*H04N 5/232* (2006.01)
*H04N 7/18* (2006.01)
*B60R 1/00* (2006.01)
*G02B 27/00* (2006.01)
*B60S 1/54* (2006.01)
*B60S 1/56* (2006.01)

(52) U.S. Cl.
CPC ............ *B62D 15/0295* (2013.01); *B60R 1/00* (2013.01); *G02B 27/0006* (2013.01); *H04N 5/23293* (2013.01); *H04N 7/181* (2013.01); *B60R 2300/105* (2013.01); *B60R 2300/607* (2013.01); *B60R 2300/70* (2013.01); *B60R 2300/8086* (2013.01); *B60S 1/54* (2013.01); *B60S 1/56* (2013.01)

(58) Field of Classification Search
CPC .......... B62D 15/0295; B60S 1/54; B60S 1/56; H04N 5/23293; H04N 7/181; B60R 1/00; G02B 27/0006
See application file for complete search history.

(56) References Cited

U.S. PATENT DOCUMENTS

| 2015/0025745 A1* | 1/2015 | Tamura | B62D 5/046 |
|---|---|---|---|
| | | | 701/41 |
| 2017/0355397 A1* | 12/2017 | Watanabe | B62D 3/12 |
| 2018/0170259 A1* | 6/2018 | Maejima | H04N 7/181 |

FOREIGN PATENT DOCUMENTS

| JP | 2009-220719 A | 10/2009 |
|---|---|---|
| JP | 2012-217000 A | 11/2012 |

* cited by examiner

*Primary Examiner* — Shawn S An
(74) *Attorney, Agent, or Firm* — Dinsmore & Shohl LLP

(57) ABSTRACT

A driving support device comprises a steering wheel 30, a protection window 211, a camera 21 for photographing a region around the own vehicle through the protection window, a display unit 50, a driving support unit 10, and a washer for washing the protection window. The driving support unit has the washer wash the protection window, when a magnitude of a steering angle of the steering wheel changes a value smaller than a threshold wash angle to a value equal to or greater than the threshold wash angle. The driving support unit has the display unit start, a display of a turn screen (530 and 550), when the magnitude of the steering angle changes from a value smaller than a threshold display angle which is greater than the threshold wash angle to a value equal to or greater than the threshold display angle.

4 Claims, 8 Drawing Sheets

DRIVING SUPPORT DEVICE

CROSS-REFERENCE TO RELATED APPLICATIONS

The present application claims priority to Japanese Patent Application No. 2017-120379 filed Jun. 20, 2017, which is herein incorporated by reference in its entirety including the specification, drawings, and abstract.

BACKGROUND

Technical Field

The present disclosure relates to a driving support device which has a display unit display a screen including an image photographed by a camera so as to support driving of a driver.

Hitherto, it has been known that a driving support device has a display unit display an image photographed by a plurality of vehicle-installed (on-board) cameras so as to support driving of a driver. For instance, as proposed in Japanese Patent Application Laid open No. 2012-217000, the driving support device (hereinafter referred to as a "conventional device") has the display unit display an image including a region corresponding to a driving situation of a vehicle among a plurality of regions photographed by the vehicle-installed cameras in response to the driving situation of the vehicle.

More specifically, when a shift position is shifted into an "R (reverse)" range under a situation where a velocity/speed of the vehicle is equal to or lower than a predetermined velocity, the conventional device has the display unit display a "back/backward image, photographed by a back/rear camera and adjusted for being displayed". When the shift position is changed from the "R" range to a "D (drive)" range under the above situation, the conventional device has the display unit display a "front image, photographed by a front camera and adjusted for being displayed". Further, the conventional device has the display unit change images displayed between the front image and a "side image, photographed by a side camera and adjusted for being displayed", every time the driver operates/pushes a selector switch.

SUMMARY

Each of the vehicle-installed cameras may comprise a protection window to protect a lens. Further, the vehicle may comprise washers (washing/cleaning devices) corresponding to the vehicle-installed cameras for washing the protection windows. For instance, each of the washers may be configured to wash one of the protection windows, when the driver operates one of wash switches, corresponding to that one of the protection windows.

Further, for instance, when the driver starts to turn/rotate a steering wheel to have the vehicle turn, the driving support device may be configured to start to have the display unit display a turn screen for supporting a driving operation performed by the driver to have the vehicle turn. The turn screen may include an image of a region corresponding to the turn direction of the vehicle. Such a driving support device has the following problem. That is, even if the driver finds that dirt is adhered to the protection window corresponding to the vehicle-installed camera which takes the image of the region included in the turn screen through watching the turn screen, the driver cannot operate the wash switch because the driver holds the steering wheel with both his/her hands. Therefore, the driver cannot operate the wash switch until the turn operation of the steering wheel terminates. As a result, the "turn screen on which the dirt is displayed" continues to be displayed until the vehicle's turn terminates.

The present disclosure has been made to solve the problem described above. An object of the present disclosure is to provide a driving support device which is able to wash, when the vehicle starts to turn, the protection window of the camera which photographs a region to be displayed in the turn screen, so as to display the clear turn screen.

A driving support device (hereinafter, referred to as "the present disclosure device") according to the present disclosure comprises:

a steering wheel (30) operated by a driver for steering a steered wheel (FT) of an own vehicle (SV);

a camera (21), including a protection window (211), for photographing a surrounding region around the own vehicle through the protection window to acquire image data;

a display unit (50) for displaying a screen including an image based on the acquired image data by the camera;

a driving support unit (10) for having the display unit display the screen so as to support driving of the driver; and a washer (22) for washing the protection window, wherein the driving support is configured to;

have the washer wash the protection window for a predetermined time period (Step 725), when a magnitude of a steering angle ($\theta$) of the steering wheel from a neutral position changes a value smaller than a threshold wash angle ($\theta$wth) to a value equal to or greater than the threshold wash angle ("Yes" at Step 735);

have the display unit start a display of a turn screen (530 and 550) including an image corresponding to a predetermined region which the driver needs to pay attention to while the own vehicle is turning and which is a part of the surrounding region (Step 830 through Step 850), when the magnitude of the steering angle changes from a value smaller than a threshold display angle which is greater than the threshold wash angle to a value equal to or greater than the threshold display angle ("Yes" at Step 735); and have the display unit terminate the display of the turn screen (Step 755), when the magnitude of the steering angle changes from a value greater than a threshold termination angle ($\theta$fth) to a value equal to or smaller than the threshold termination angle while the display unit is displaying the turn screen ("Yes" at Step 745).

According to the present disclosure device, the washer washes the protection window of the camera before the turn screen is displayed so that the dirt is not displayed in the turn screen. Therefore, the present disclosure can display the clear turn screen.

In one aspect of the present disclosure, the driving support unit is configured to have the display unit display the turn screen such that the predetermined region corresponding to the image in the turn screen includes a region of one specific side of a right side and a left side of the own vehicle, the one specific side corresponding to a turn direction of the own vehicle (surrounding image sections 541 and 561 illustrated in FIG. 5).

Thus, when the own vehicle SV turns, the driver can recognize a surround of a side corresponding to the turn direction of the own vehicle SV, especially, a possibility of an involution accident.

In one aspect of the present disclosure, the driving support unit is configured to have the display unit display a straight screen (500) including an image corresponding to a region which the driver needs to pay attention to while the own vehicle is traveling straight and which is a part of the surrounding region (Step 820 and Step 825), when the driving support unit is not having the display unit display the turn screen.

With this aspect, the driver can look at the image corresponding to the region which the driver needs to pay attention to while the own vehicle is traveling straight, so as to recognize a surround in this region. When the driver finds that the dirt which has been adhered to the protection window is displayed in the straight screen, the driver can take necessary actions for the dirt before the turn screen is displayed. Therefore, a probability that the dirt is displayed in the turn screen which is displayed while the driver is holding the steering wheel can be reduced.

In one aspect of the present disclosure, the driving support unit is configured to:

have the display unit display one of the straight screen and the tarn screen, only when a velocity (Vs) of the own vehicle is equal to or lower than a predetermined threshold velocity (Vs1th) ("Yes" at Step 610); and have the washer wash the protection window, when the magnitude of the steering angle changes the value smaller than the threshold wash angle to the value equal to or greater than the threshold wash angle, and the velocity of the own vehicle is equal to or lower than the predetermined threshold velocity (Step 725).

In general, the velocity of the own vehicle is likely to be/become equal to or lower the threshold velocity before the own vehicle starts turning. Thus, the above aspect of the present disclosure device can display the straight screen at an appropriate timing and the turn screen at an appropriate timing, and wash the protection window before the turn screen is displayed.

In the above description, in order to facilitate the understanding of the disclosure, reference symbols used in embodiment of the present disclosure are enclosed in parentheses and are assigned to each of the constituent features of the disclosure corresponding to the embodiment. However, each of the constituent features of the disclosure is not limited to the embodiment as defined by the reference symbols. Other objects, other features, and attendant advantages of the present disclosure will be readily appreciated from the following description of the embodiment of the disclosure which is made with reference to the accompanying drawings.

DESCRIPTION OF THE EMBODIMENTS

A driving support device according to one embodiment of the present disclosure will next be described with reference to the drawings.

Figure 1:
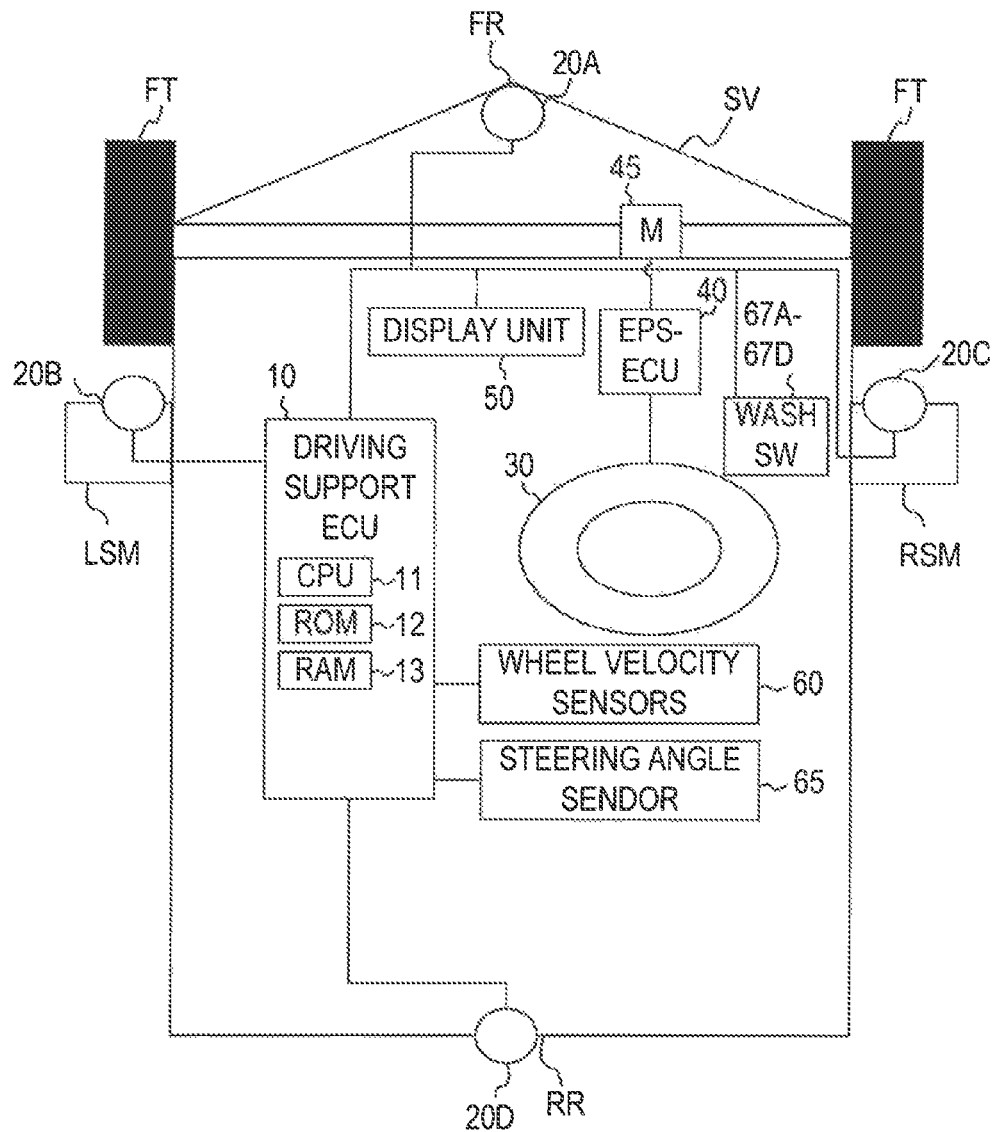
FIG. 1 is a schematic system configuration diagram for illustrating a driving support device according to an embodiment of the present disclosure.

FIG. 1 is a schematic configuration diagram of the driving support device (hereinafter referred to as a "support device") according to the embodiment of the present disclosure. A vehicle in which the support device is mounted/installed is referred to as an "own vehicle SV", when this vehicle needs to be distinguished from other vehicles. When the vehicle SV turns, the support device displays a turn screen (screen for turning) so as to support driving of a driver. The turn screen is a screen corresponding to a turn direction of the own vehicle SV and is either a left turn screen 530 illustrated in FIG. 5 or a right turn screen 550 illustrated in FIG. 5. The support device is able to wash protection windows 211 (referring to FIGS. 2A to 2C) correspond to cameras 21 (referring to FIGS. 2A to 2C) before displaying the turn screen.

The support device includes a driving support ECU 10 (hereinafter, referred to as a "DSECU 10"). It should be noted that an ECU is an abbreviation of an "Electronic Control Unit" which includes a microcomputer as, a main part. The microcomputer of the ECU 10 includes a CPU 11 and memories (for example, a ROM 12, a RAM 13, and the like). The CPU 11 achieves various functions by executing instructions (program, routine) stored in the ROM 12.

The support device further includes a front camera system 20A, a left camera system 20B, a right camera system 200, a rear camera system 20D, a steering wheel 30, EPS-ECU 40, a steering motor (M) 45, a display unit 50, wheel speed sensors 60, a steering angle sensor 65, and wash switches (wash SWs) 67A through 67D. It should be noted that an EPS is an abbreviation of an "electric power steering". The front camera system 20A, the left camera system 20B, the right camera system 200, and the rear camera system 20D are collectively referred to as "camera systems 20", when they need not to be distinguished from each other. The wash switches 67A through 67D are collectively referred to as "wash switches 67", when they need not to be distinguished from each other. The DSECU 10 is connected to the camera systems 20, the EPS-ECU 40, the wheel speed sensors 60, the steering angle sensor 65, and the wash switches 67.

Firstly, the camera systems are described.

The front camera system 20A is arranged at the center in a vehicle width direction of the front end portion FR of the own vehicle SV. The left camera system 20B is arranged on a left side of the own vehicle SV. The right camera system 200 is arranged on a right side of the own vehicle V. The rear camera system 20D is arranged at the center in the vehicle width direction of the rear end portion RR of the own vehicle SV.

Figure 2A:
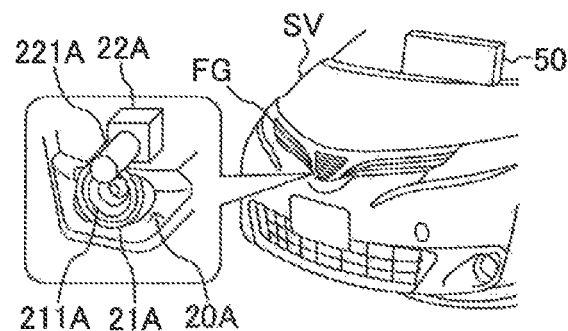
FIG. 2A is an explanatory diagram for illustrating an arrangement position of a front camera system illustrated in FIG. 1.
Figure 2B:
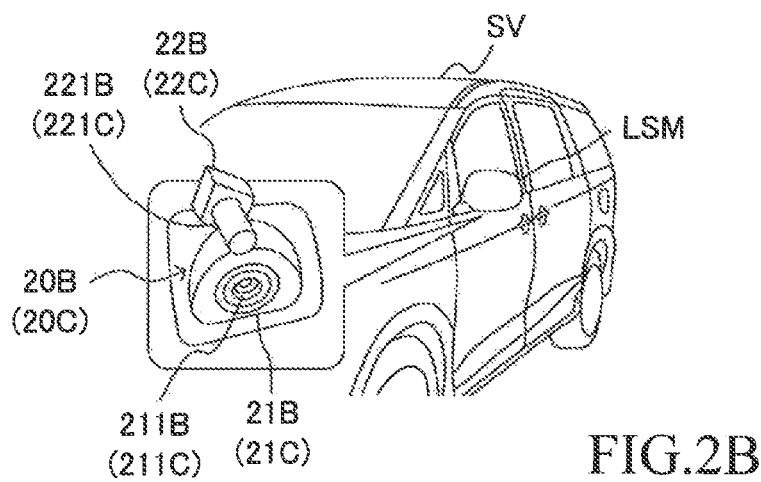
FIG. 2B is an explanatory diagram for illustrating an arrangement position of a left side camera system illustrated in FIG. 1.
Figure 2C:
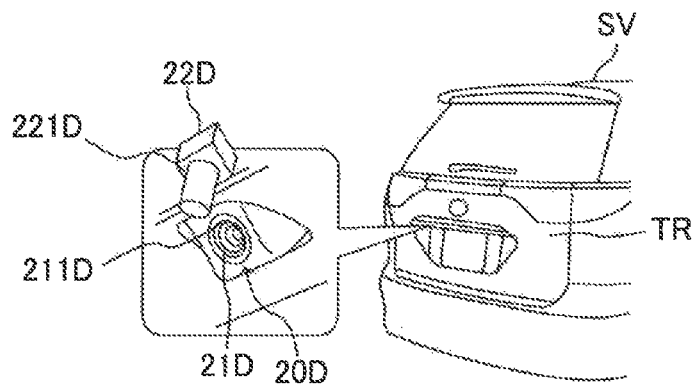
FIG. 2C is an explanatory diagram for flu rating an arrangement position of a rear camera system illustrated in FIG. 1.

More specifically, as illustrated in FIG. 2A, the front camera system 20A is arranged at the center in the vehicle width direction of a front grill FG of the own vehicle SV. As illustrated in FIG. 2B, the left side camera system 20B is arranged at a left side mirror LSM of the own vehicle SV. The right camera system 20O is arranged at a right side mirror RSM of the own vehicle SV, similarly to the left camera system 20B. As illustrated in FIG. 2C, the rear camera system 20D is arranged at the center in the vehicle width direction of a trunk TR of the own vehicle SV.

As illustrated in FIG. 2A, the front camera system 20A includes a camera 21A for photographing (taking an image of) a scenery of a certain region specific to the camera 21A to acquire image data on the certain region, and a washer 22A which is able to wash a protection window 211A of the camera 21A. The protection window 211A is a light-transmitting plate member (now shown), and provided to protect a lens of the camera 21A from mud, dust, and the like. For example, the protection window 211A is a window made of transparent glass or transparent resin.

Figure 3:
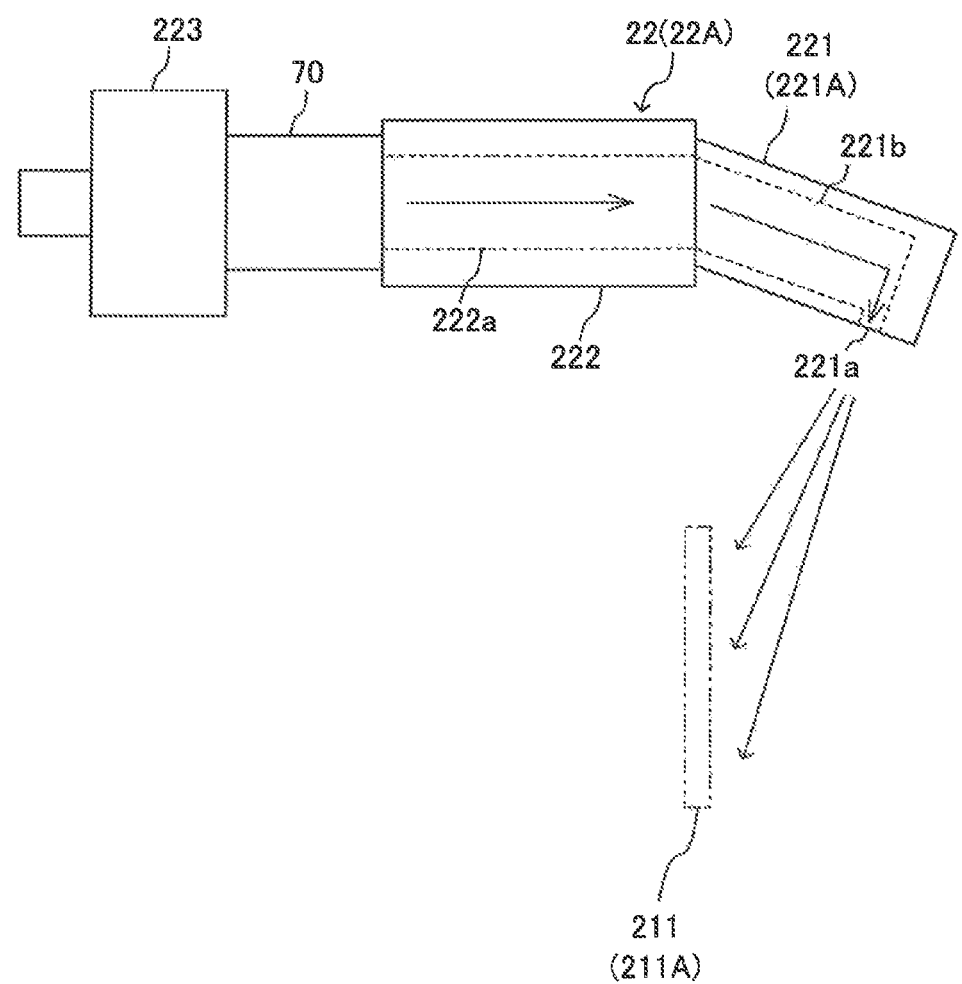
FIG. 3 is a detailed explanatory diagram for illustrating a washer.

The washer 22A includes a nozzle 221A. The nozzle 221A is arranged above the protection window 211A, and protrudes to an outside of the own vehicle SV. As illustrated in FIG. 3, a spray opening 221a is formed in the vicinity of a tip portion of the nozzle 221A so as to be opposed to the protection window 211A. The washer 22A washes the protection window 211A through spraying compressed air from the spray opening 221a toward the protection window 211A.

Similarly, as illustrated in FIG. 2B, the camera system 20B includes a camera 218 and a washer 22B. The camera 21B includes a protection window 211B. The washer 22B includes a nozzle 221B, and washes the protection window 211 B through spraying compressed air from an unillustrated spray opening formed in the vicinity of a tip portion of the nozzle 221B toward the protection window 211B.

Further, the camera system 20C includes a camera 21C and a washer 22C. The camera 21C includes a protection window 211C. The washer 22C includes a nozzle 221C, and washes the protection window 211C through spraying compressed air from an unillustrated spray opening formed in the vicinity of a tip portion of the nozzle 221C toward the protection window 211C.

Similarly, as illustrated in FIG. 2C, the camera system 20D includes a camera 21D and a washer 22D. The camera 21D includes a protection window 211D. The washer 22D includes a nozzle 221D, and washes the protection window 211D through spraying compressed air from an unillustrated spray opening formed in the vicinity of a tip portion of the nozzle 221D toward the protection window 211D.

In the following, the cameras 21A to 21D are collectively referred to as "cameras 21", when they need not to be distinguished from each other. The washers 22A through 22O are collectively referred to as "washers 22", when they need not to be distinguished from each other. The protection windows 211A through 211D are collectively referred to as "protection windows 211", when they need not to be distinguished from each other. The nozzles 221A through 221D are collectively referred to as "nozzles 221", when they need not to be distinguished from each other.

Each of the cameras 21 illustrated in FIG. 2 is connected to the DSECU 10. The cameras 21 photographs the surrounding region of the own vehicle SV to acquire image data on the surrounding region. Each of the cameras 21 transmits, to the DSECU 10, the image data representing the image which is photographed/taken every time a predetermined period elapses.

Referring to FIG. 3, a description is now given of the washer 22 of the camera system 20.

Each of the washers 22 includes, in addition to the nozzle 221, a merging joint 222, and an air pump 223. The nozzle 221 is connected to one end of the merging joint 222 in a longitudinal direction, and an air pump 223 is connected to the other end of the merging joint 222 via a pipe 70.

The spray opening 221a and the flow passage 221b are provided/formed in the nozzle 221. As described above, the spray opening 221a is provided/arranged at the "location of the nozzle 221" opposed to the protection window 211 of the camera 21. The flow passage 221b is provided from an end of the merging joint 222 at a side of the nozzle 221 to the spray opening 221a.

The air pump 223 compresses the air through rotation of an electric motor, and discharges the compressed air from the pipe 70 connected to itself. The electric motor of the air pump 223 is connected to the DSECU 10, and receives a command from the DSECU 10, to thereby activate (rotate) or stop itself.

A flow passage 222a is formed so as to pass through the merging joint 222 in the longitudinal direction inside the merging joint 222. One end of the flow passage 222a is connected to the pipe 70, and the other end of the flow passage 222a is connected to the flow passage 221b of the nozzle 221.

When this support device has the washer 22 wash the protection window 211, the support device activates the air pump 223. When the air pump 223 is activated, the compressed air passes through the pipe 70, passes through the flow passage 222a in the merging joint 222, passes through the flow passage 221b in the nozzle 221, and is sprayed from the spray opening 221a of the nozzle 221 toward the protection window 211. The support device stops the operation of the air pump 223 at a time point at which a predetermined period has elapsed since a time point at which the air pump 223 was activated.

The steering wheel 30 illustrated in FIG. 1 is steered by the driver. When the steering wheel 30 is steered from a neutral position to a left direction, steered wheels FT of the own vehicle SV are steered to the left direction by an angle corresponding to an angle (a steering angle θ) from the neutral position of the steering wheel 30. On the other hand, when the steering wheel 30 is steered from the neutral position to a right direction, the steered wheels FT of the own vehicle SV are steered to the right direction by an angle corresponding to the steering angle θ of the steering wheel 30.

The EPS-ECU 40 is a control device for a well-known electric power steering system, and is connected to the steering motor 45. The steering motor 45 is installed in a "steering mechanism of the own vehicle SV including the steering wheel 30, a steering shaft connected with the steering wheel 30, a steering gear mechanism, and the like" of the own vehicle SV. The steering motor 45 generates torque by using electric power supplied from the EPS-ECU 40. This torque is used for generating steering assist torque and for turning the left and right steered wheels FT.

The display unit 50 illustrated in FIG. 1 receives display information from the ECUs in the own vehicle SV and a navigation device in the own vehicle SV, and displays the received display information. As illustrated in FIG. 2A, the display unit 50 is arranged on an instrument, panel inside of the own vehicle SV.

Each of the wheel velocity/speed sensors 60 is provided in the corresponding one of the wheels. Each of the wheel velocity sensors 60 detects predetermined number of pulse signals (wheel pulse signals) per one rotation of the corresponding one of the wheels. Thereafter, each of the wheel velocity sensors 60 transmits the detected wheel pulse signal to the DSECU 10, every time each of the wheel velocity sensors 60 detects the wheel pulse signal. It should be noted that the DSECU 10 calculates a rotation velocity/speed (wheel velocity) of each of the wheels based on the number of the pulse signals which have been transmitted from the corresponding one of the wheel velocity sensors 60 per unit time period. Thereafter, the DSECU 10 calculates the velocity/speed. Vs of the own vehicle SV based on the wheel velocity of each of the wheels.

The steering angle sensor 65 detects the steering angle of the steering wheel 30. The steering angle sensor 65 detects the steering angle $\theta$, and transmits the detected steering angle $\theta$ to the DSECU 10 as a steering angle signal. The detected steering angle $\theta$ is positive when the steering wheel 30 is steered from the neutral position to the right direction, and is negative when the steering wheel 30 is steered from the neutral position to the left direction.

The wash switches 67A through 67D are provided in the vicinity of the steering wheel 30 of the own vehicle SV. When the driver desires to wash each of the protection windows 211, the driver operates the corresponding one of the wash switches 67A through 673. When the switch 67A is operated, the washer 22A washes the protection window 211A. When the switch 67B is operated, the washer 22B washes the protection window 211B. When the switch 67C is operated, the washer 22C washes the protection window 211C. When the switch 67D is operated, the washer 22D washes the protection window 211D.

Figure 4:
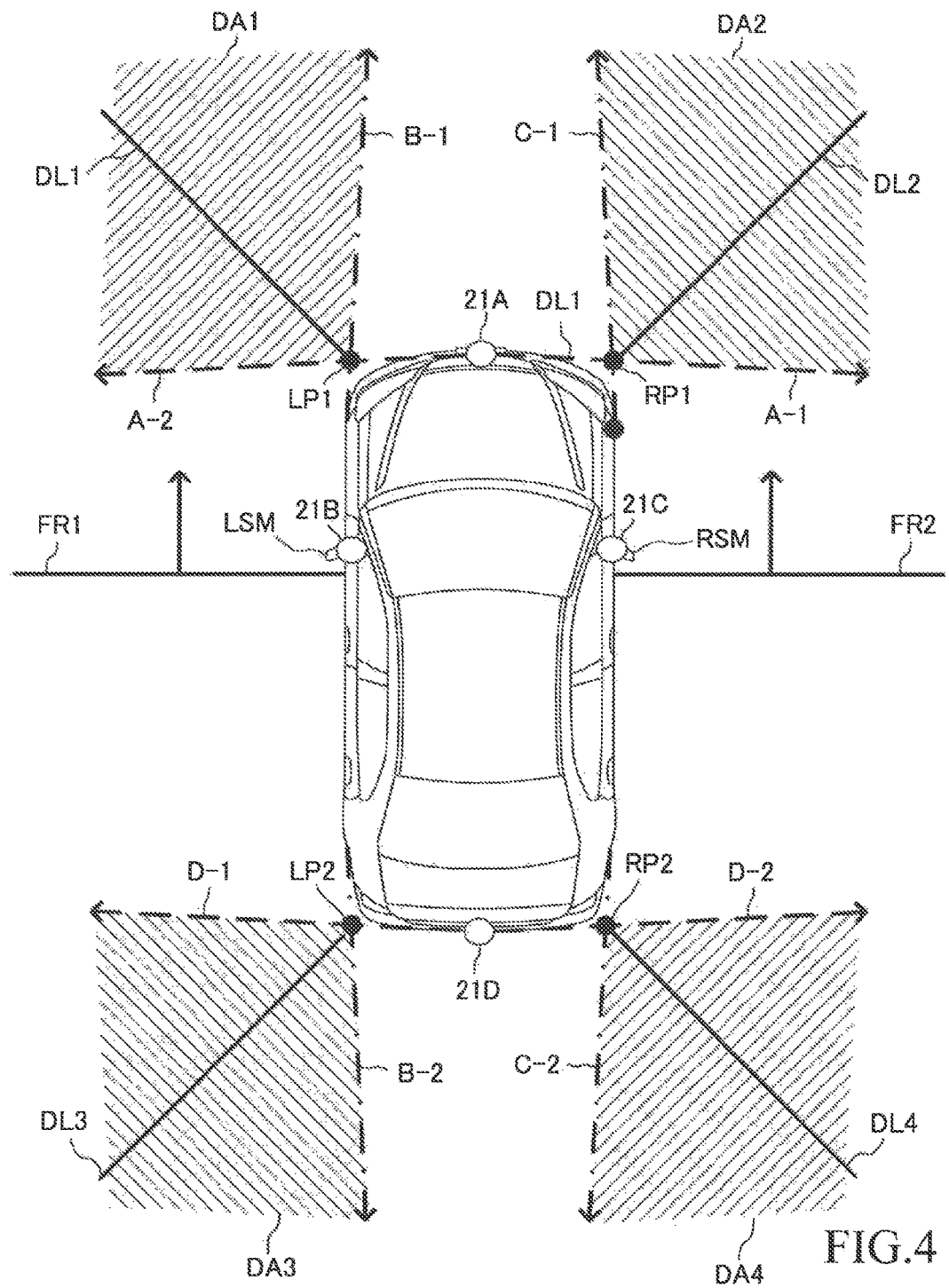
FIG. 4 is an explanatory diagram for illustrating imaging regions of respective cameras.

Referring to FIG. 4, a description is now given of imaged regions of the respective cameras 21. A fisheye lens or the like is employed as a lens of each of the cameras 21, and thus, a view angle of each of the cameras 21 is equal to or larger than 180 degrees. The imaging ranges of the cameras 21 are illustrated in FIG. 4.

More specifically, the imaging range of the camera 21A is a range between the line A-1 indicated by a broken line and the line A-2 indicated by a broken line. The imaging range of the camera 21B is a range between the line B-1 indicated by a dashed-dotted line and the line B-2 indicated by a dashed-dotted line. The imaging range of the camera 21 is a range between the line C-1 indicated by a dashed-dotted line and the line C-2 indicated by a dashed-dotted line. The imaging range of the camera 21D is a range between the line D-1 indicated by a broken line and the line D-2 indicated by a broken line. The DSECU 10 recognize an entire periphery of the own vehicle SV using the images photographed/taken by all of the cameras 21A through 21D.

<Outline of Operation>

A description is now given of an operation of this support device. When a shift lever of an unillustrated automatic transmission has been moved/shifted to any one of a drive range and a neutral range, and the velocity Vs of the own vehicle SV is equal to or lower than a threshold velocity Vs1$th$, the support device performs any one of the following controls.

Figure 5:
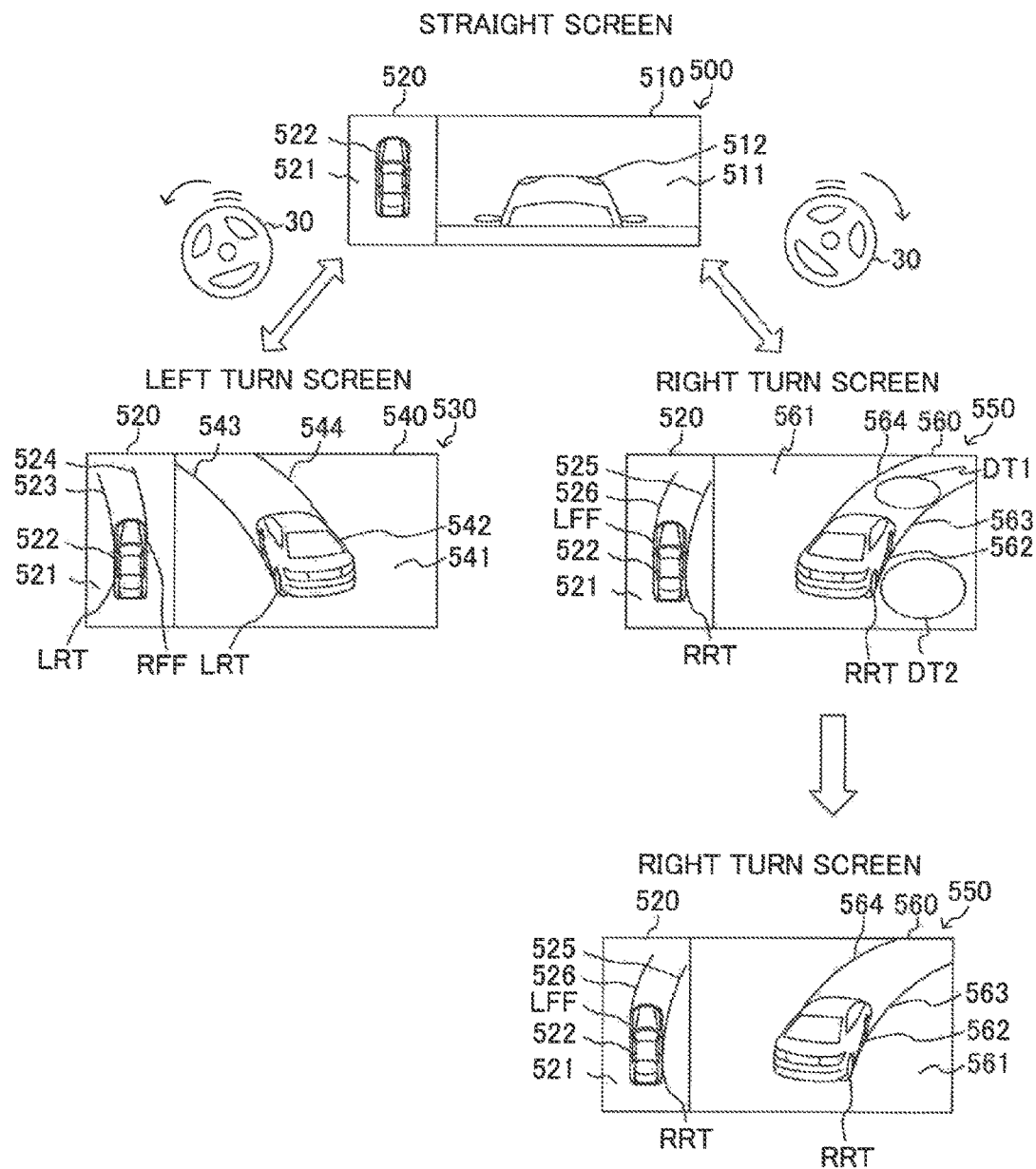
FIG. 5 is n explanatory diagram for illustrating a straight screen and turn screens.

(1) When magnitude of the steering angle $\theta$ is smaller than a threshold display angle $\theta dth$, the support device has the display unit 50 display a straight screen (screen for traveling straight) 500 illustrated in FIG. 5.

(2-1) When the magnitude of the steering angle $\theta$ changes from a value smaller than the threshold display angle $\theta dth$ to a value equal to or greater than the threshold display angle $\theta dth$, and the steering angle $\theta$ is negative (i.e., the own vehicle SV is turning left), the support device has the display unit 50 start to display a left turn screen (screen for turning left) 530 illustrated, in FIG. 5.

(2-2) When the magnitude of the steering angle $\theta$ changes from the value smaller than the threshold display angle $\theta dth$ to the value equal to or greater than the threshold display angle $\theta dth$, and the steering angle $\theta$ is positive (i.e., the own vehicle SV is turning right), the support device has the display unit 50 start to display a right turn screen (screen for turning right) 550 illustrated in FIG. 5.

The left turn screen 530 and the right turn screen 550 are collectively referred to as "turn screens", when they need not to be distinguished from each other.

When the dirt is adhered to at least one of the protection windows 211 at a time point at which the magnitude of the steering angle $\theta$ changes from the value smaller than the threshold display angle $\theta dth$ to the value equal to or greater than the threshold display angle $\theta dth$ so that the turn screen starts to be displayed, the dirt is displayed in the turn screen (the dirt is displayed in the turn screen). In this case, the driver cannot operate the wash switches 67 since the driver is performing the steering operation of the steering wheel 30. Therefore, the support device is unlikely to wash the protection window 211 with the dirt (or get rid of the dirt) until the driver terminates the steering operation of the steering wheel 30, in other words, the own vehicle terminates the turn.

In view of the above, the support device automatically has the washers 22A through 22D wash the protection windows 211A through 211D of the camera 21A through 21D, when the magnitude of the steering angle $\theta$ changes from a value smaller than "a threshold wash angle $\theta wth$ smaller than the threshold display angle $\theta dth$" to a value equal to or greater than the threshold wash, angle $\theta wth$.

Thus, the support can wash the protection windows 211A through 211D before (immediately before) the turn screen is displayed. As a result, the support device can reduce the probability that the unclear/blurred turn screen due to the adhered dirt continues to be displayed. Accordingly, the support device can provide the driver with the turn screen which is appropriate for the drives.

<Detail of Operation>

The support device acquires pieces/sets of image data from the respective cameras 21A through 21D every time a predetermined period elapses. Then, the support device generates image data (hereinafter referred to as "3D (three dimensions) image data") on a 3D curved surface, corresponding to the surrounding/peripheral region of the own vehicle SV, based on the acquired image data. More specifically, the support device projects each of pixel values of the image data acquired from the cameras 21A to 21D to a pixel contained in the 3D curved surface which is semi-spherical. A center of a bottom surface of the 3D curved surface coincides with (a center of a bottom surface of) the own vehicle SV. A relationship between each of the pixels of the image data acquired from the cameras 21A to 21D and each of the pixel of the 3D curved surface are defined in advance. The support, device displays the straight screen 500, the left turn screen 530, or the right turn screen 550 (referring to FIG. 5), using the generated 3D image data.

Generation processes for such 3D image data is widely-known (for example, refer to Japanese Patent Application Laid-open No. 2012-217000).

Referring to FIG. 4, a description is now given of the relationship between each of the pixels of the image data and each of the pixels of the 3D image data.

The 3D image data is divided in advance so as to form a front region, a right side region, a left side region, and a rear region. Specifically, pixels contained in the front region of the 3D image data and the pixels contained in a region between a partition line DL1 and a partition line DL2 of the image data of the camera 21A are associated with each other. The partition line DL1 is a line segment extending from an intersection point LP1 between a line segment B-1 and a line segment A-2 so as to define an overlap region DA1. In the overlap area DA1, an imaging region of the camera 21A and an imaging region of the camera 21B overlap each other. The partition line DL2 is a line segment extending from an intersection point RP1 between the line segment A-1 and a line segment C-2 so as to define an overlap region DA2. In the overlap region DA2, the imaging region of the camera 21A and an imaging region of the camera 21C overlap each other.

Pixels contained in the left side region of the 3D image data and the pixels contained in a region between the partition line DL1 and a partition line DL3 of the image data of the camera 21B are associated with each other. The partition line DL3 is a line segment extending from an intersection point LP2 between a line segment B-2 and a line segment D-1 so as to define an overlap region DA3. In the overlap area. DA3, the imaging region of the camera 21B and an imaging region of the camera 21D overlap each other.

Pixels contained in the right side region of the 3D image data and the pixels contained in a region between the partition line DL2 and a partition line DL4 of the image data of the camera 21C are associated with each other. The partition line DL4 is a line segment extending from an intersection point RP2 between a line segment C-2 and a line segment D-2 so as to define an overlap region DA4. In the overlap area DA4, the imaging region of the camera 21C and an imaging region of the camera 21D overlap each other.

Pixels contained in the rear region of the 3D image data and the pixels contained in a region between the partition line DL3 and the partition line DL4 of the image data of the camera 21D are associated with each other.

Referring to FIG. 5, a description is now given of the straight screen 500, the left turn screen 530, and the right turn screen 550 are displayed using the above described 3D image data.

First, a description of the straight screen 500 is given.

The straight screen 500 includes a straight 3D image section 510 and a top view image section 520. The straight 3D image section 510 includes a surrounding/peripheral image section 511 and an own vehicle image 512. The surrounding image section 511 includes an image corresponding to "a predetermined region which the driver needs to pay attention to when the own vehicle SV is traveling straight" in the 3D image data. The image corresponding to the predetermined region includes an image obtained when a predetermined region in front of the own vehicle SV is viewed directly from a straight view point which is set to the center position in the width direction of a roof of the own vehicle SV in the 3D image data. More specifically, the surrounding image section 511 includes an image obtained when a region in front of "a line segment FR1 extending from a point in the vicinity of the left side mirror LSM to the left direction in the width direction (referring to FIG. 4)" and "a line segment FR2 extending from a point in the vicinity of the right side mirror RSM to the right direction in the width direction (referring to FIG. 4)" is viewed directly from the straight view point in the 3D image data. Therefore, the surrounding image section 511 is generated based on an image corresponding to all of the region photographed by the camera 21A, an image corresponding to a part of the region photographed by the camera 21B, and an image corresponding to a part of the region photographed by the camera 21C. The driver looks at the surrounding image section 511 to recognize a situation in front of the own vehicle SV, a situation in left front of the own vehicle SV, and a situation in right front of the own vehicle SV.

The own vehicle image 512 is set to this support device in advance. In other words, the own vehicle image 512 is not images photographed by the cameras 21. The own vehicle image 512 is an image of the own vehicle SV when the own vehicle SV is viewed directly from the above straight view point. The driver looks at the surrounding image section 511 and the own vehicle image 512 to intuitively recognize a relationship between a location of the own vehicle SV and locations of objects in the surrounding region of the own vehicle SV.

The top view image section 520 includes a surrounding image section 521 and an own vehicle image 522. The top view image section 520 is an image obtained when a predetermined region around the own vehicle SV is viewed directly from above in the 3D image data. The own vehicle image 522 is set to this support device in advance. In other words, the own vehicle image 522 is not images photographed by the cameras 21. The own vehicle image 522 is a 3D image of the own vehicle SV when the own vehicle SV is viewed directly from above.

The straight screen 500 includes the straight 3D image section 510 and the top view image section 520, whose view points are different from each other. Therefore, the drive can easily recognize a situation outside of the own vehicle SV in a surrounding region of the own vehicle SV.

Next, a description of the left turn screen 530 is given.

The left turn screen 530 includes a left turn 3D image section 540 and the top view image section 520. The left turn image section 540 includes a surrounding image section 541 and an own vehicle image 542. The surrounding image section 541 includes an image corresponding to "a predetermined region which the driver needs to pay attention to when the own vehicle SV is turning left" in the 3D image data. The image corresponding to the predetermined region includes an image corresponding to a left side region of the own vehicle SV in the 3D image data. More specifically, the surrounding image section 541 includes the image corresponding to the predetermined region obtained when the left side and the rear of the own vehicle SV are viewed directly from "a left turn view point which is set to a point in a left rear region from the own vehicle SV" in the 3D image data. The left turn view point and a view direction from the left turn view point are set such that the image corresponding to the predetermined region includes an image corresponding to "a left, rear wheel LRT which is a rear wheel in inner side when the own vehicle SV turns left". The surrounding image section 541 is generated based on the image photographed by each of cameras 21A through 21D.

The driver looks at the left turn 3D image section 540 to recognize a situation in the left side of the own vehicle SV, especially a probability of an involution accident when the own vehicle SV turns left.

The own vehicle image 542 is set to this support device in advance. In other words, the own vehicle image 542 is not images photographed by the cameras 21. The own vehicle image 542 is a 3D image of the own vehicle SV when the own vehicle SV is viewed directly from the left turn view point. The driver looks at the surrounding image section 541 and the own vehicle image 542 to intuitively recognize a relationship between the location of the own vehicle SV and the locations of the objects in the surrounding region of the own vehicle SV.

The left turn 3D image section 540 further includes an image 543 representing a predicted path of the left rear wheel LRT of the own vehicle SV, and an image 544 representing a predicted path of a right front fender portion RFF. Thus, the driver can easily recognize predicted paths of portions of the own vehicle SV which are likely to contact with other object when the own vehicle SV turns left.

A region from the left side to the right front fender portion RFF in the own vehicle image 542 may be set to be a transparent region such that the driver can look at an image in back of the right front fender portion RFF which is included the surrounding image section 541. Therefore, the driver can easily recognize a location relationship between the right front fender portion RFF and the objects in the surrounding region of the own vehicle SV. This is especially useful for the own vehicle SV to travel in a narrow road.

The top view screen section 520 of the left turn screen 530 includes an image 523 representing a predicted path of the left rear wheel LRT of the own vehicle SV and an image 524 representing a predicted path of the right front fender RFF of the own vehicle SV. The top view screen section 520 of the left turn screen 530 is the same as the top view screen section 520 of the straight screen 500 except the above respect. Therefore, a description of the top view screen section 520 of the left turn screen 530 is omitted.

Next, a description of the right turn screen 550 is given.

The right turn, screen 550 includes a right turn 3D image section 560 and e top view image section 520. The right turn image section 560 includes a surrounding image section 561 and an own vehicle image 562. The surrounding image section 561 includes an image corresponding to "a predetermined region which the driver needs to pay attention to when the own vehicle SV is turning right" in the 3D image data. The image corresponding to the predetermined region includes an image corresponding to a right side region of the own vehicle SV in the 3D image data. More specifically, the surrounding image section 561 includes the image corresponding to the predetermined region obtained when the right side and the rear of the own vehicle SV are viewed directly from "a right turn view point which is set to a point in a right rear region from the own vehicle SV" in the 3D image data. The right turn view point and a view direction from the right turn view point are set such that the image corresponding to the predetermined region includes an image corresponding to "a right rear wheel RRT which is a rear wheel in inner side when the own vehicle SV turns right". The surrounding image section 561 is generated based on the image photographed by each of cameras 21A through 21E).

The driver looks at the right turn 3D image section 560 to recognize a situation in the right side of the own vehicle SV, especially a probability of an involution accident when the own vehicle SV turns right.

The own vehicle image 562 is set to this support device in advance. In other words, the own vehicle image 562 is not images photographed by the cameras 21. The own vehicle image 562 is a 3D image of the own vehicle SV when the own vehicle SV is viewed directly from the right turn view point. The driver looks at the surrounding image section 561 and the own vehicle image 562 to intuitively recognize a relationship between the location of the own vehicle SV and the locations of the objects in the surrounding region of the own vehicle SV.

The right turn 3D image section 560 further includes an image 563 representing a predicted path of the right rear wheel RRT of the own vehicle SV, and an image 564 representing a predicted path of a left front fender portion LFF. Thus, the driver can easily recognize predicted paths of portions of the own vehicle SV which are likely to contact with other object when the own vehicle SV turns right.

A region from the right side to the left front fender portion LFF in the own vehicle image 562 may be set to be a transparent region such that the driver can look at an image in back of the left front fender portion LFF which is included the surrounding image section 561. Therefore, the driver can easily recognize a location relationship between the left front fender portion LFF and the objects in the surrounding region of the own vehicle SV. This is especially useful for the own vehicle SV to travel in the narrow road.

The top view screen section 520 of the right turn screen 550 includes an image 525 representing a predicted path of the right rear wheel RRT of the own vehicle SV and an image 526 representing a predicted path of the left front fender LFF of the own vehicle SV. The top view screen section 520 of the right turn screen 550 is the same as the top view screen section 520 of the straight screen 500 except the above respect. Therefore, a description of the top view screen section 520 of the left turn screen 550 is omitted.

Behaviors of the own vehicle SV and screens displayed on, the display unit 50 are sequentially changed in order of the following (A) to (D), in a case where the own vehicle travels/runs straight, then turns, and then travels straight again.

(A) The own vehicle SV travels at a velocity Vs greater than a threshold velocity Vs1$th$. In this case, any one of the straight screen 500 and the turn screens is not displayed on the display unit 50.

(B) The own vehicle SV starts to decelerate. Thereafter, the velocity Vs of the own vehicle SV becomes equal to or lower than the threshold velocity Vs1$th$. In this case, the straight screen 500 is displayed on the display unit 50.

(C) The driver starts to perform the steering operation of the steering wheel 30. The magnitude of the steering angle θ becomes equal to or greater than the threshold display angle θdth. In this case, one of the turn screens corresponding to the turn direction is displayed on the display unit 50.

(D) The magnitude of the steering angle θ becomes equal to or smaller than the threshold termination angle θfth. In this case, the straight screen 500 is displayed on the display unit 50.

When the dirt is displayed in the straight 3D image section 510 of the straight screen 500 (that is, the straight 3D image section 510 is made unclear/blurred due to the dirt) in the case of the above (B), the driver can find/notice the dirt when (through) looking at the straight screen 500. In this case, the driver operates one of the wash switches 67 corresponding to one of the camera 21 to which the dirt seems to be adhered, so that the driver can have one of the washers 22 corresponding to that one of the wash switches 67 wash the corresponding one of the protection windows 211. However, the straight screen 500 may sometimes be displayed for a very short time period in the case of the above (B), depending on the behavior of the own vehicle SV. In this case, the time period for which the driver can look at (watch) the straight screen 500 is short. Therefore, the driver may not be able to find/notice the dirt displayed in the straight 3D image section 510 of the straight screen 500. As a result, the turn screen into which the dirt is displayed may be displayed (referring to a dirt DT1 in the right turn screen 550 illustrated in FIG. 5).

Further, the dirt is sometimes adhered to a part of the protection windows 211 but is not displayed in the straight 3D image section 510 depending on, the part. In this case, even if the driver looks at (watches) the straight screen 510, the driver cannot find/notice the dirt. As a result, the turn screen in which the dirt is displayed may be displayed (referring to a dirt DT2 in the right turn screen 550 illustrated in FIG. 5).

In view of the above, the support device has the washers 22A through 22D wash the protection windows 211A through 211D before the turn screen starts to be displayed, as described above. Therefore, the support device can effectively prevent the turn screen in which the dirt is displayed from being displayed.

<Specific Operation>

Figure 6:
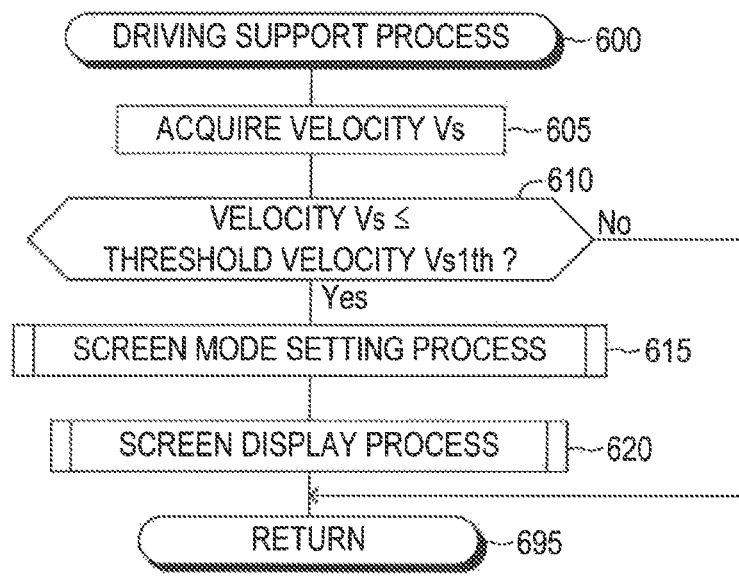
FIG. 6 is a flowchart for illustrating a routine which is to be executed by a CPU of a driving support ECU illustrated in FIG. 1.

The CPU 11 of the DSECU 10 executes a routine represented by a flow chart shown in FIG. 6, every time a predetermined time period elapses under a situation where the unillustrated shift lever of the unillustrated automatic transmission has been moved/shifted to any one of the drive range and the neutral range. The routine illustrated shown in FIG. 6 is a routine for displaying any one of the straight screen 500 and the turn screens so as to support the driving (operation) of the driver.

When a predetermined timing has come, the CPU 11 starts the process from Step 600 illustrated in FIG. 6, acquires the velocity Vs or the own vehicle SV based on the wheel pulse signal from each of the wheel velocity sensors 60 in Step 605, and proceeds to Step 610.

At Step 610, the CPU 11 determines whether or not the velocity Vs is equal to or lower than the threshold velocity Vs1$th$. When the velocity Vs is higher than the threshold velocity Vs1$th$, the CPU 11 makes a "No" determination at Step 610, and proceeds to Step 695. As a result, any one of the screens is not displayed on the display unit 50.

When the velocity is equal to or lower than the threshold velocity Vs1$th$, the CPU 11 makes a "Yes" determination at Step 610, and proceeds to Step 615. At Step 615, the CPU 11 executes a screen mode setting process for setting a screen mode to one of a straight screen mode and a turn screen mode. In actuality, when the CPU 11 proceeds to Step 615, the CPU 11 executes a subroutine represented by a flowchart illustrated in FIG. 7.

Figure 7:
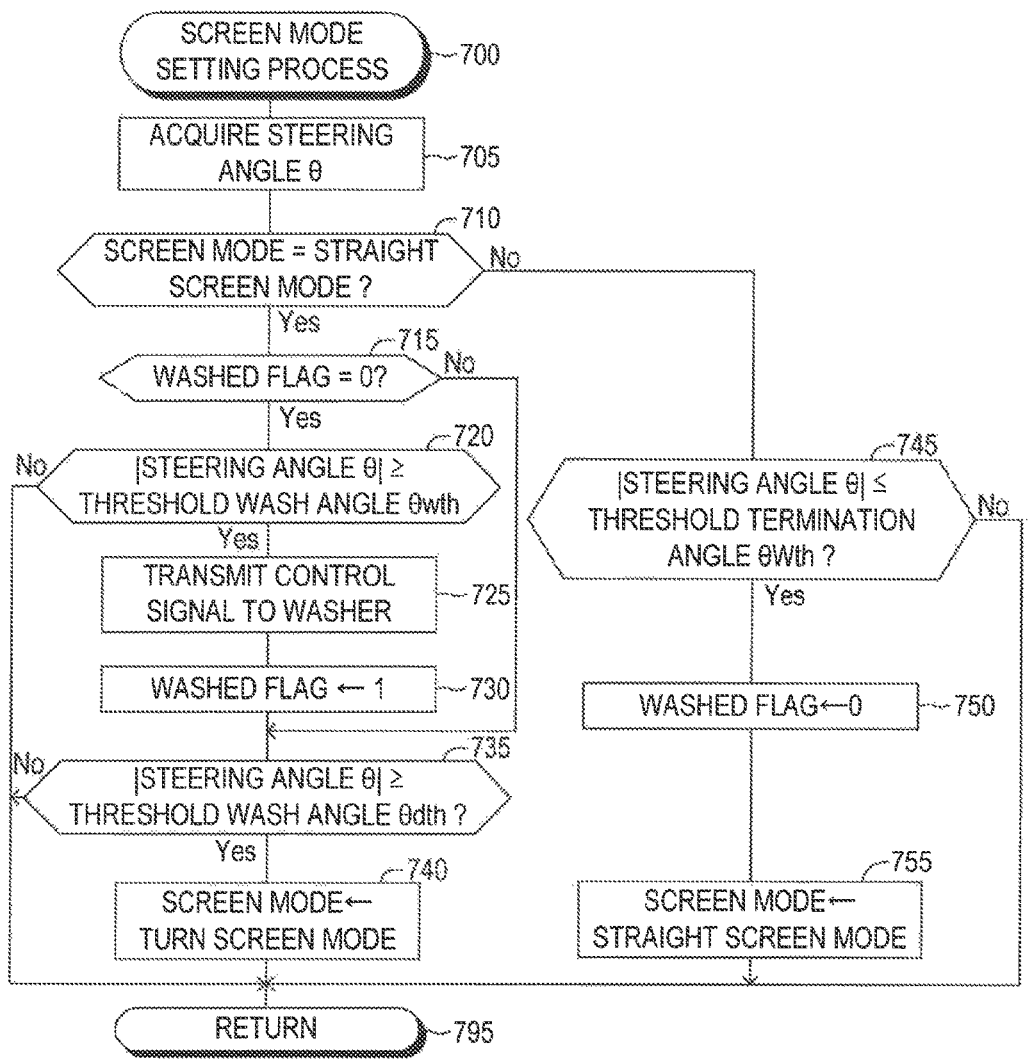
FIG. 7 is a flowchart for illustrating a routine which is to be executed by the CPU of the driving support ECU in a screen mode setting process illustrated in FIG. 6.

When the CPU 11 proceeds to Step 615, the CPU 11 starts the process from Step 700 illustrated in FIG. 7, and proceeds to Step 705. At Step 705, the CPU 11 acquires the steering angle θ indicative of the angle from the neutral position of the steering wheel 30 based on the steering angle signal from the steering angle sensor 65, and proceeds to Step 710.

At Step 710, the CPU 11 determines whether or not the screen mode is set to the straight screen mode. The screen mode can be set at either the straight screen mode or the turn screen mode. When the screen is set at the straight screen mode, the CPU 11 has the display unit 50 display the straight screen 500 (refer to Step 825 illustrated in FIG. 8). On the other hand, in a case where the screen mode is set at the turn screen mode, the CPU 11 has the display unit 50 display the left turn screen 530 (refer to Step 840 illustrated in FIG. 8) when the own vehicle SV turns left, and the CPU 11 has the display unit 50 display the right turn screen 550 (refer to Step 850 illustrated in FIG. 8) when the own vehicle SV turns right. The screen mode has been set to the straight screen mode in an initial state. The initial state is a state at which the driver performs an operation to change a position of an ignition key switch of the own vehicle SV from an off position to an on position.

When the screen mode is set at the straight screen mode, the CPU 11 makes a "Yes" determination at Step 710, and proceeds to Step 715 to determine whether or not a value of a washed flag is set a "0". As described later, when the magnitude of the steering angle θ changes from the value smaller than the threshold wash angle θwth to the value equal to or greater than the threshold wash angle θwth, washing the protection windows 211 by the washers 22 is performed before the turn screen is displayed, and the value of the washed flag is set to "1" (refer to Step 720 through Step 730 described later). The value of the washed flag, continues being "1" until the magnitude of the steering angle θ changes from the value greater than the threshold termination angle θfth to the value equal to or smaller the threshold termination angle θfth (refer to Step 745 and Step 770 described later). That is, when the magnitude of the steering angle θ becomes equal to or greater than the threshold wash angle θwth, the washing by the washers 22 is performed. Thereafter, the turn screen is displayed. The value of the washed flag continues being set at "1" until the turn screen is terminated and the straight screen 500 is displayed. It should be noted that the value of the washed flag, has been set at "0" in the above described initial state.

When the value of the washed flag is set at "0", the CPU 11 makes a "Yes" determination at Step 715, and proceeds to Step 720. At Step 720, the CPU 11 determines whether or not the magnitude of the steering angle θ acquired at Step 705 is equal to or greater than the threshold wash angle θwth. In this example, the threshold wash angle θwth is "150 deg".

When the magnitude of the steering angle θ is smaller than the threshold wash angle θwth, the CPU 11 makes a "No" determination at Step 720, and proceeds to Step 795 to tentatively terminate the present routine. Thereafter, the CPU 11 proceeds to Step 620 illustrated in FIG. 6. As a result, the screen mode is not changed from the straight screen mode.

At Step 620, the CPU 11 executes a screen display process to have the display unit 50 display the screen corresponding to the screen mode which has been set. In actuality, when the CPU 11 proceeds to Step 620, the CPU 11 executes a subroutine represented by a flowchart illustrated in FIG. 8.

Figure 8:
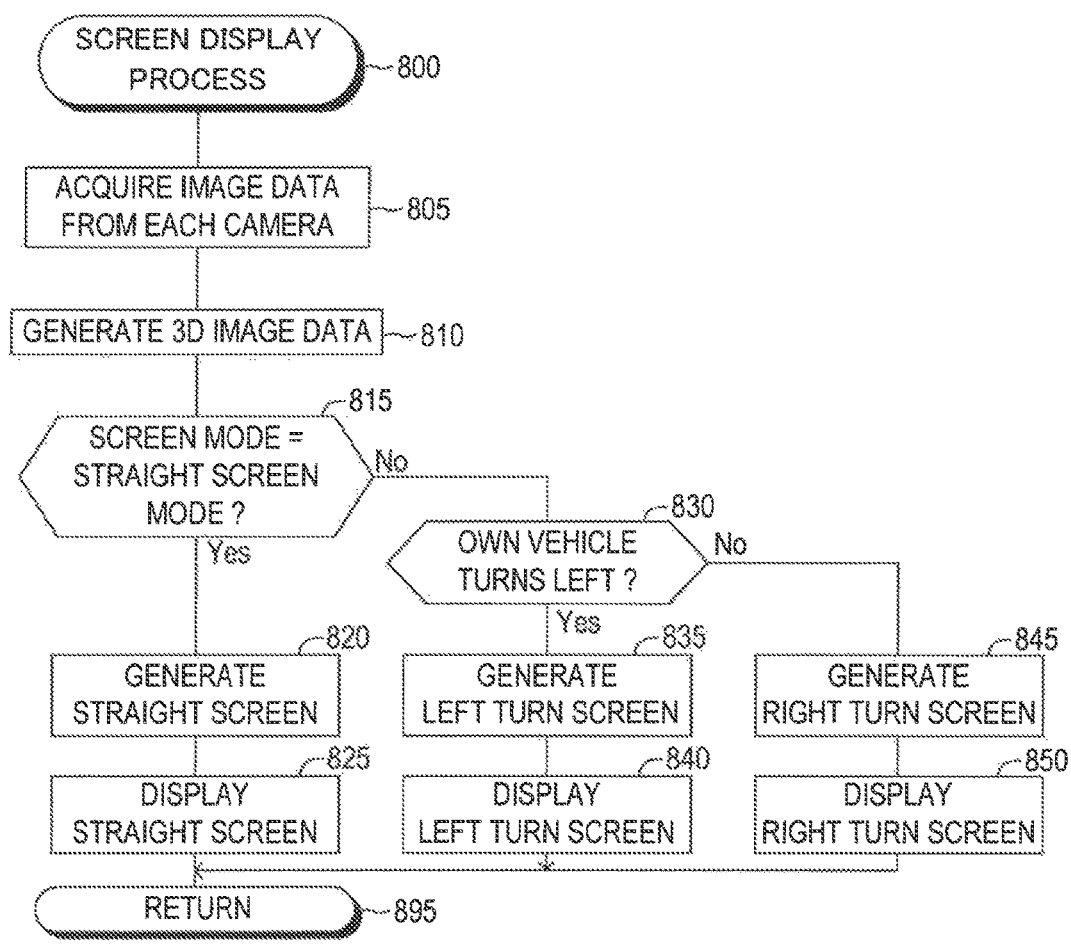
FIG. 8 is a flowchart for illustrating a routine which is to be executed by the CPU of the driving support ECU in a screen display process illustrated in FIG. 6.

When the CPU 11 proceeds to Step 620, the CPU 11 starts the process from Step 800 illustrated in FIG. 8, and proceeds to Step 805. At Step 805, the CPU 11 acquires image data from each of the camera 21A through 21D, and proceeds to Step 810.

At Step 810, the CPU 11 generates the 3D image data based on each of the image data acquired at Step 805 according to the above described method, and proceeds to Step 815. At Step 815, the CPU 11 determines whether or not the screen mode is set at the straight screen mode.

When the screen mode is set at the straight screen mode, the CPU 11 makes a "Yes" determination at Step 815, and proceeds to Step 820. At Step 820, the CPU 11 generates the straight screen 500 according to the above described method.

Subsequently, the CPU 11 proceeds to Step 825 to have the display unit 50 display the straight screen 500 generated at Step 820, and proceeds to Step 895 to tentatively terminate the present routine. Thereafter, the CPU 11 proceeds to Step 695 illustrated in FIG. 6 to tentatively terminate the routine illustrated in FIG. 6.

The magnitude of the steering angle θ becomes greater gradually, while the driver continues rotating the steering wheel 30 in order to have the own vehicle SV turn. When the magnitude of the steering angle θ becomes greater than the threshold wash angle θwth, the CPU 11 makes a "Yes" determination at Step 720, and proceeds to Step 725.

At Step 725, the CPU 11 transmits a control signal to have the washers 22A through 220 spray the compressed air for the predetermined time period. When the air pump 223 of each of the washers 22A through 22D receives the control signal, the air pump 223 has the electric motor rotate to compress the air. Thereafter, the compressed air is sprayed from the spray opening 221a of each of the washers 22A through 22D toward the corresponding one of the protection windows 211A through 211I for the predetermined time period. That is, the CPU 11 has each of the washers 22 wash the corresponding one of the protection windows 211.

After the process at Step 725 is performed, the CPU 11 proceeds to Step 730 to set the value of the washed flag to "1", and proceeds to Step 735 to determine whether or not the magnitude of the steering angle θ is equal to or greater than the threshold display angle θdth. The threshold display angle θdth is greater than the threshold wash angle θwth. In this example, the threshold display angle θdth is "180 deg".

The magnitude of the steering angle θ is smaller than the threshold display angle θdth, immediately after the magnitude of the steering angle θ becomes equal to or greater than the threshold wash angle θwth. Therefore, the CPU 11 makes a "No" determination at Step 735, and proceeds 620 illustrated in FIG. 6 via Step 795. As a result, the screen mode is not changed from the straight screen mode. Therefore, the above described Step 805 through Step 825 illustrated in FIG. 5 are executed so that the straight screen 500 continues being displayed on the display unit 50.

When the CPU 11 proceeds to Step 615 illustrated in FIG. 6 to start the process of the Step 700 illustrated in FIG. 7 under the situation described above, the CPU 11 makes a "Yes" determination at Step 710. Furthermore, the CPU 11 makes a "No" determination at Step 715, and directly proceeds to Step 735, because the value of the washed flag has been set to "1". When the magnitude of the steering angle θ is smaller than the threshold display angle θdth, the CPU 11 makes a "No" determination at Step 735, and proceeds to Step 620 illustrated in FIG. 6 via Step 795. As a result, when the value of the washed flag has been set to "1", the CPU 11 does not proceed to the Step 725. Therefore, even if the magnitude of the steering angle θ is equal to or greater than the threshold wash angle θwth, the CPU 11 does not have the washers 22 wash the protection windows 211.

When the driver further rotates the steering wheel 30, the magnitude of the steering angle θ changes from the value smaller than the threshold display angle θdth to the value equal to or greater than the threshold display angle θdth. In this case, when the CPU 11 proceeds to Step 735, the CPU 11 makes a "Yes" determination at Step 735, and proceeds to Step 740 to set the screen mode to the turn screen mode. Thereafter, the CPU 11 proceeds to Step 620 via Step 795. As a result, the screen mode is changed from the straight screen to the turn screen mode.

In this case, when the CPU 11 proceeds to Step 620 illustrated in FIG. 6, the CPU 11 starts the process of the Step 800 illustrated in FIG. 8. Thereafter, the CPU 11 executes Step 805 and Step 810, and proceeds to Step 815.

The CPU 11 makes a "No" determination at Step 815, and proceeds to Step 830, because the screen mode has been set to the turn screen mode at Step 740 illustrated in FIG. 7. At Step 830, the CPU 11 determines whether or not the own vehicle SV is turning left. More specifically, the CPU 11 determines that the own vehicle SV is turning right when the steering angle θ is positive. On the other hand, the CPU 11 determines that the own vehicle SV is turning left when the steering angle θ is negative.

When the own vehicle SV is turning left, the CPU 11 makes a "Yes" determination at Step 830, and proceeds to Step 835. At Step 835, the CPU 11 generates the left turn screen 530 according to the above described method.

Subsequently, the CPU 11 proceeds to Step 840 to have the display unit 50 display the left turn screen 530 generated at Step 835, and proceeds to Step 895 to tentatively terminate the present routine. Thereafter, the CPU 11 proceeds to Step 695 illustrated in FIG. 6 to tentatively terminate the routine illustrated in FIG. 6.

On the other hand, when the own vehicle SV is turning right, the CPU 11 makes a "No" determination at Step 830, and proceeds to Step 845. At Step 845, the CPU 11 generates the right turn screen 550 according to the above described method.

Subsequently, the CPU 11 proceeds to Step 850 to have the display unit 50 display the right turn screen 550 generated at Step 845, and proceeds to Step 895 to tentatively terminate the present routine. Thereafter, the CPU 11 proceeds to Step 695 illustrated in FIG. 6 to tentatively terminate the routine illustrated in FIG. 6.

At this stage, the screen mode has been set at the turn screen mode at Step 740. Thus, when the CPU 11 executes Step 710, the CPU 11 makes a "No" determination at Step 710, and proceeds to Step 745.

At Step 745, the CPU 11 determines whether or not the magnitude of the steering angle θ is equal to or smaller than the threshold termination angle θfth. The threshold termination angle θfth is equal to or smaller than the threshold display angle θdth. In this example, the threshold termination angle θfth is set at a value (i.e. 90 deg) smaller the threshold wash angle θwth.

When the own vehicle SV is still turning, the magnitude of the steering angle θ is greater than the threshold termination angle θfth. In this case, the CPU 11 makes a "No" determination at Step 745, and proceeds to Step 620 illustrated in FIG. 6 via Step 795. As a result, the screen mode is not changed from the turn screen mode. Therefore, in the routine illustrated in FIG. 8, the CPU 11 makes a "No" determination at Step 815, displays the left turn screen 530 when the own vehicle SV is turning left, and displays the right turn screen 550 when the own vehicle SV is turning right.

Thereafter, when the driver starts to terminate the steering operation, the magnitude of the steering angle θ becomes equal to or smaller than the threshold termination angle θfth. In this case, when the CPU 11 proceeds to Step 745, the CPU 11 makes a "Yes" determination at Step 745, and proceeds to Step 750. At Step 750, the CPU 11 sets the value of the washed flag to "0", and proceeds to Step 755. At Step 755, the CPU 11 sets the screen mode to the straight screen mode, and proceeds to Step 620 illustrated in FIG. 6 via Step 795. At this stage, the screen mode has been set to the straight screen mode. Thus. The CPU 11 executes Step 805 through Step 825 described above so as to have the display unit 50 display the straight screen 500.

The value of the washed flag which has been set to "1" at Step 730 is set to "0" at Step 750. That is, when the washers 22 has washed the protection windows 211 once, the value of the washed flag is maintained at "1" till a time point at which the magnitude of the steering angle θ becomes equal to or smaller than the threshold termination angle θfth. Therefore, the washers 22 washes the protection windows 211 only one time while the own vehicle SV is turning (i.e., for one turning period which is a period from a start of turning to an end of that turning). The dirt is unlikely to be adhered to at least one of the protection windows 211 for one turning period (i.e., while the own vehicle SV has turned once). Therefore, a possibility that the protection windows 211 is washed unnecessarily can be reduced. This can reduce power consumption by the air pump 223.

When the magnitude of the steering angle θ has not become equal to or greater than the threshold display angle θdth for a considerably long time period after the magnitude of the steering angle θ changed from the value smaller than the threshold wash angle θwth to the value equal to or greater than the threshold wash angle θwth, the value of the washed flag has been set at "1". Therefore, the CPU 11 executes an unillustrated routine so as to return the value of the washed flag to "0" when the status where the value of the washed flag is set at "1" continues for the considerably long time period.

As understood from the above example, the support device has the washers 22 wash the protection windows 211, when the magnitude of the steering angle θ changes from the value smaller than the threshold wash angle θwth to the value equal to or greater than the threshold wash angle θwth. The support device has the display unit 50 display the turn screen, when the magnitude of the steering θ changes from the value smaller than the threshold display angle θdth to the value equal to or greater than the threshold display angle θdth. Thus, the protection windows 211 are washed (immediately) before the turn screen is displayed. Therefore, this support device can prevent the dirt from being displayed in the turn screen which is displayed while the driver cannot generate a wash instruction since the driver is operating/holding the steering wheel 30. Accordingly, the support device can provide the driver with the appropriate image for the driver.

The present disclosure is not limited to the above-mentioned embodiment, and can adopts various modifications of the present disclosure. For instance, the washer 22 sprays the compressed air from the spray opening 221a toward the protection window 211 to wash the protection window 211, but the present disclosure is not limited to this example. The washer 22 may spray a mixture of washing liquid and the compressed air from the spray opening 221a toward the protection window 211. In this case, this support device needs to include a reserve tank in which the washing liquid is reserved, a pipe to supply the washing liquid from the reserve tank to each of the washers 22, and the washing liquid pump to draw/pump the washing liquid reserved in the washing liquid tank. Each of the washers 22 further includes the corresponding one of on-off valves to open/close a flow passage of the washing liquid formed in the pipe for supplying the washing liquid to itself.

In this case, when the DSECU 10 has the washer 22 wash the protection window 211, the DSECU 10 activates (rotates) the air pump 223, brings the on-off valve into an open state so that the flow passage is opened, and activates (rotates) the washing liquid pump. Thus, the mixture of the washing liquid and the compressed air is sprayed from the spray opening 221a toward the protection window 211. A time period for activating (rotating) the air pump 223 may be set to be longer than a time period for setting the on-off valve into the open state. Therefore, after spraying the mixture, the compressed air alone is sprayed toward the protection window 211. This can prevent the washing liquid from remain on the protection window 211.

The surrounding image section 511 of the straight 3D image section 510 of the straight screen 500 illustrated in FIG. 5 may include the image corresponding to "the predetermined region which the driver needs to pay attention to when the own vehicle SV is traveling straight". The surrounding image section 511 may include at least one of an image corresponding to the above described front region in the 3D image data, in other words, the image photographed by the camera 21A, because the predetermined region is a region in front of the own vehicle SV.

The surrounding image section 541 of the left turn 3D image section 540 of the left turn screen 530 illustrated in FIG. 5 may include the image corresponding to "the predetermined region which the driver needs to pay attention to when the own vehicle SV is turning left". The surrounding image section 541 may include at least one of an image corresponding to the above described left side region in 3D image data, in other words, the image photographed by the camera 21B, because the predetermined region is a region in left side of the own vehicle SV. Similarly, the surrounding image section 561 of the right turn 3D image section 560 of the right turn screen 550 illustrated in FIG. 5 may include the image corresponding to "the predetermined region which the driver needs to pay attention to when the own vehicle SV is turning right". The surrounding image section 561 may include at least one of an image corresponding to the above described right side region in 3D image data, in other words, the image photographed by the camera 21C, because the predetermined region is a region in right side of the own vehicle SV.

In this case, when the magnitude of the steering angle θ changes from the value smaller than the threshold wash angle θwth to the value equal to or greater than the threshold wash angle θwth, this support device determines whether or not the own vehicle SV turns left. When the own vehicle SV turns left, this support device has the washer 21B wash the protection 211B of the camera 21B. On the other hand, when the own vehicle SV turns right, this support device has the washer 21C wash the protection 211C of the camera 21C.

Each the straight screen 500, the left turn screen 520, and the right turn screen 550 includes the top view image section 520, but each of them may not include the top view image section 520.

This support device may not include the rear camera system 20D. In this case, the image of the region corresponding to the image photographed by the camera 21D (the region between the partition line DL3 and the partition line DL4 illustrated in FIG. 4) is not displayed in the straight screen 500, the left turn screen 530, and the right turn screen 550 illustrated in FIG. 5. Similarly, the image of the region corresponding to the image photographed by the camera 21D (the region between the partition line DL3 and the pardon line DL4 illustrated in FIG. 4) is not dot displayed in the surrounding image section 541 of the left turn screen 530, and the surrounding image section 561 of the right turn screen 550.

Step 606 and Step 610 illustrated in FIG. 6 in the above described embodiment are omitted. That is, any one of the straight screen and the turn screens may be displayed regardless of the velocity Vs of the own vehicle SV.

What is claimed is:
1. A driving support device comprising:
   a steering wheel operated by a driver for steering a steered wheel of an own vehicle;
   a camera, including a protection window, for photographing a surrounding region around the own vehicle through the protection window to acquire image data;
   a display unit for displaying a screen including an image based on the acquired image data by the camera;
   a driving support unit for having the display unit display the screen so as to support driving of the driver; and
   a washer for washing the protection window,
   wherein
   the driving support is configured to:
   have the washer wash the protection window for a predetermined time period, when a magnitude of a steering angle of the steering wheel from a neutral position changes a value smaller than a threshold wash angle to a value equal to or greater than the threshold wash angle;

have the display unit start a display of a turn screen including an image corresponding to a predetermined region which the driver needs to pay attention to while the own vehicle is turning and which is a part of the surrounding region, when the magnitude of the steering angle changes from a value smaller than a threshold display angle which is greater than the threshold wash angle to a value equal to or greater than the threshold display angle; and have the display unit terminate the display of the turn screen, when the magnitude of the steering angle changes from a value greater than a threshold termination angle to a value equal to or smaller than the threshold termination angle while the display unit is displaying the turn screen.

2. The driving support device according to claim 1, wherein
the driving support unit is configured to have the display unit display the turn screen such that the predetermined region corresponding to the image in the turn screen includes a region of one specific side of a right side and a left side of the own vehicle, the one specific side corresponding to a turn direction of the own vehicle.

3. The driving support device according to claim 1, wherein
the driving support unit is configured to have the display unit display a straight screen including an image corresponding to a region which the driver needs to pay attention to while the own vehicle is traveling straight and which is a part of the surrounding region, when the driving support unit is not having the display unit display the turn screen.

4. The driving support device according to claim 3, wherein
the driving support unit is configured to:
have the display unit display one of the straight screen and the turn screen, only when a velocity of the own vehicle is equal to or lower than a predetermined threshold velocity; and
have the washer wash the protection window, when the magnitude of the steering angle changes the value smaller than the threshold wash angle to the value equal to or greater than the threshold wash angle, and the velocity of the own vehicle is equal to or lower than the predetermined threshold velocity.

* * * * *

UNITED STATES PATENT AND TRADEMARK OFFICE
CERTIFICATE OF CORRECTION

PATENT NO. : 10,328,974 B2
APPLICATION NO. : 16/012039
DATED : June 25, 2019
INVENTOR(S) : Kosuke Shichino and Kayo Yoshida Page 1 of 2

It is certified that error appears in the above-identified patent and that said Letters Patent is hereby corrected as shown below:

On the Title Page

Item (57), abstract, Line 10, after "start" delete ",".

In the Specification

In Column 1, Line 23, delete "Laid open" and insert --Laid-open--, therefor.

In Column 3, Line 23, delete "tarn" and insert --turn--, therefor.

In Column 4, Line 3, before "explanatory", delete "n" and insert --an--, therefor.

In Column 4, Line 38, after "as", delete ",".

In Column 4, Line 44, delete "right camera system 200" and insert --right camera system 20C--, therefor.

In Column 4, Line 51, delete "right camera system 200" and insert --right camera system 20C--, therefor.

In Column 4, Line 64, delete "right camera system 200" and insert --right camera system 20C--, therefor.

In Column 5, Line 6, delete "right camera system 200" and insert --right camera system 20C--, therefor.

In Column 5, Line 31, delete "camera 218" and insert --camera 21B--, therefor.

In Column 5, Line 53, delete "220" and insert --22D--, therefor.

Signed and Sealed this
Twentieth Day of August, 2019

Andrei Iancu
*Director of the United States Patent and Trademark Office*

CERTIFICATE OF CORRECTION (continued)
U.S. Pat. No. 10,328,974 B2

In Column 6, Line 63, after "instrument", delete ",".

In Column 7, Line 25, delete "673" and insert --67D--, therefor.

In Column 7, Line 43, delete "camera 21" and insert --camera 21C--, therefor.

In Column 8, Line 40, delete "drives" and insert --driver--, therefor.

In Column 9, Line 23, after "area", delete ".".

In Column 10, Line 28, delete "drive" and insert --driver--, therefor.

In Column 10, Line 50, after "left", delete ",".

In Column 11, Line 27, delete "right turn, screen", insert --right turn screen--, therefor.

In Column 11, Line 28, before "top", delete "e" and insert --the--, therefor.

In Column 11, Line 49, delete "21E)" and insert --21D--, therefor.

In Column 12, Line 23, after "on", delete ",".

In Column 12, Line 66, after "on", delete ",".

In Column 14, Line 18, after "flag", delete ",".

In Column 14, Line 66, delete "220" and insert --22D--, therefor.

In Column 15, Line 6, delete "2111" and insert --211D--, therefor.

In Column 18, Line 17, delete "camera 210" and insert --camera 21C--, therefor.

In Column 18, Line 42, delete "pardon" and insert --partition--, therefor.

In Column 18, Line 42, after "not", delete "dot".